March 18, 1930. G. E. WEBB 1,750,978
AUTOMATIC MEASURING TANK
Filed Sept. 17, 1925 3 Sheets-Sheet 1
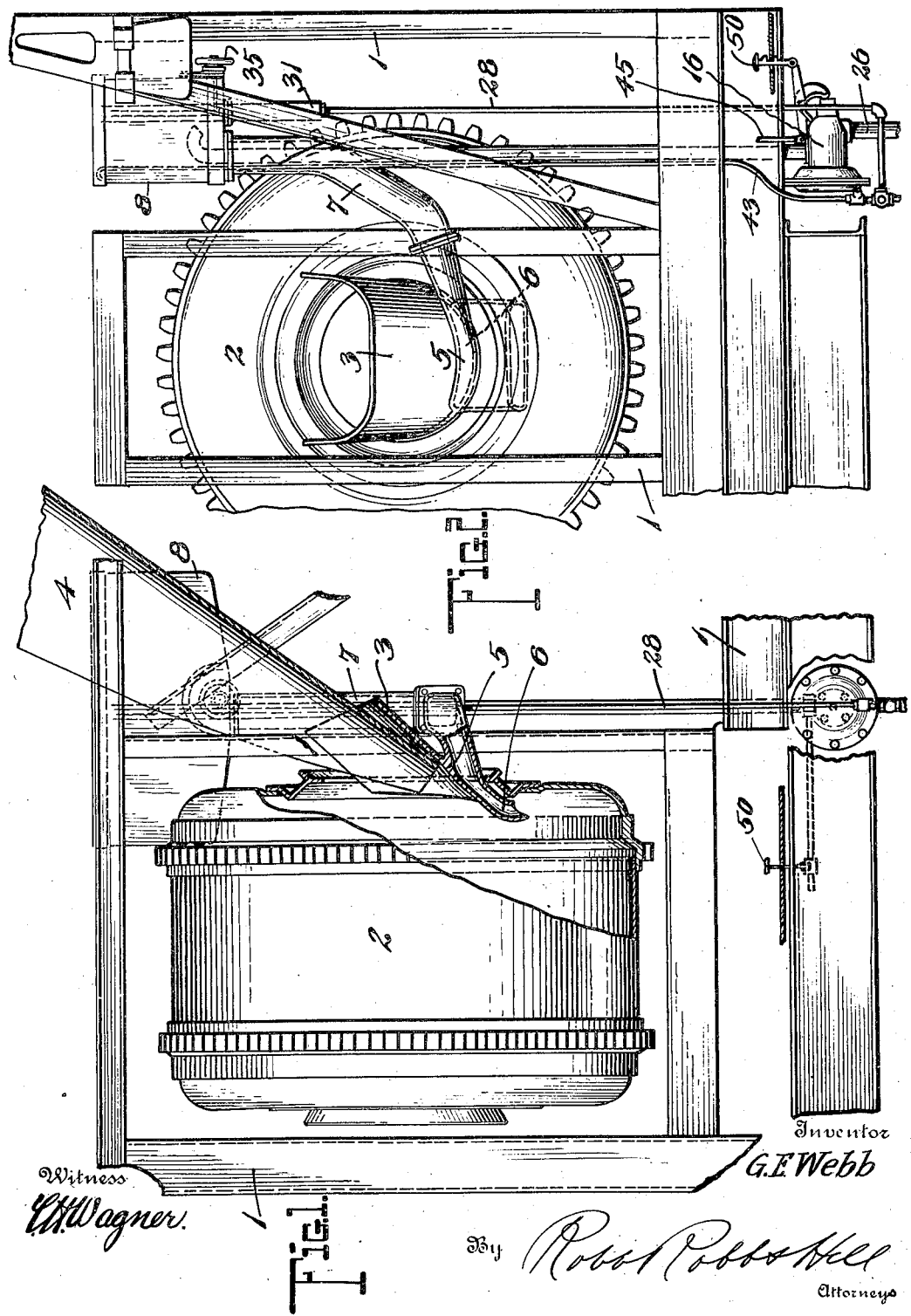
Inventor
G. F. Webb

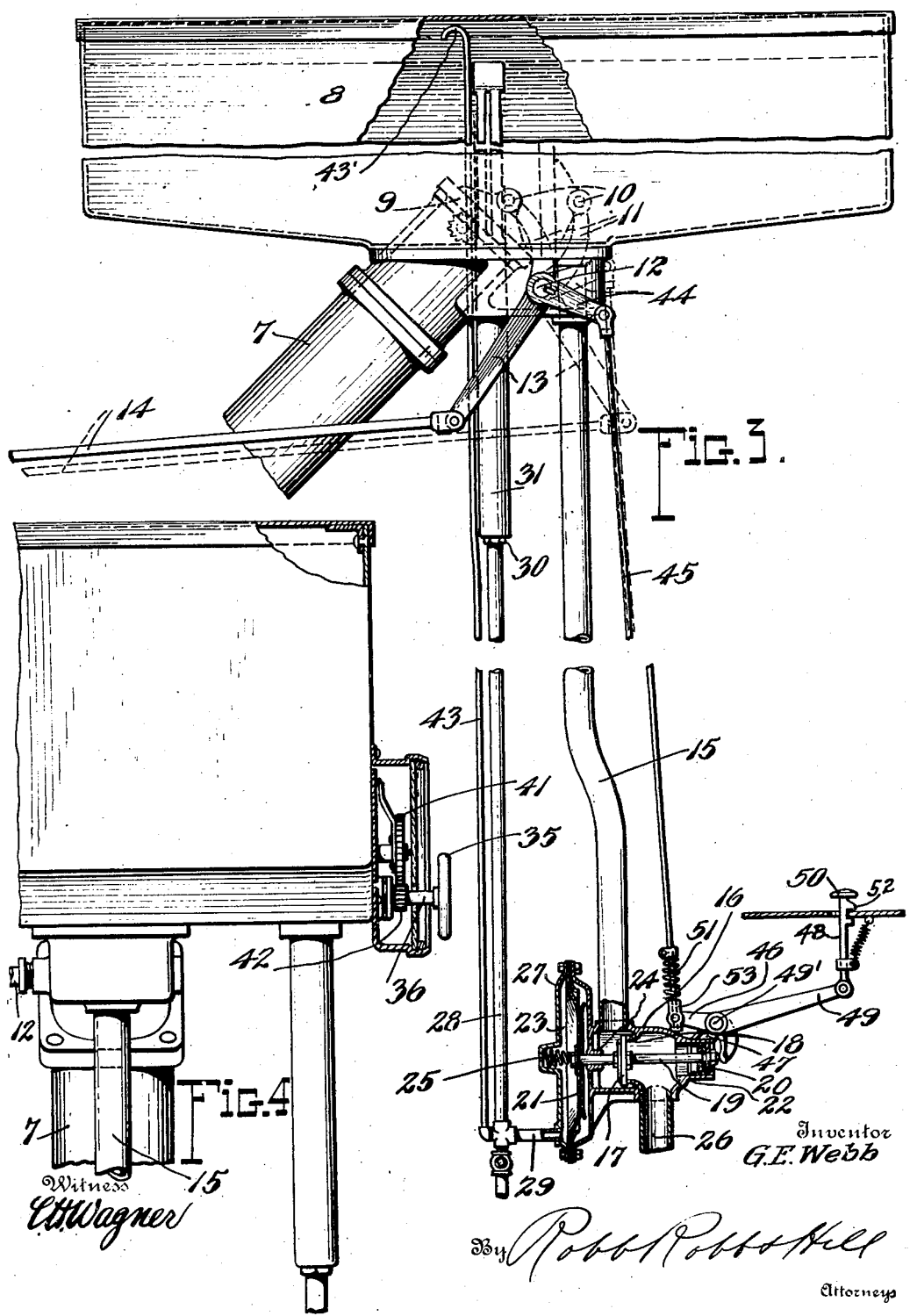

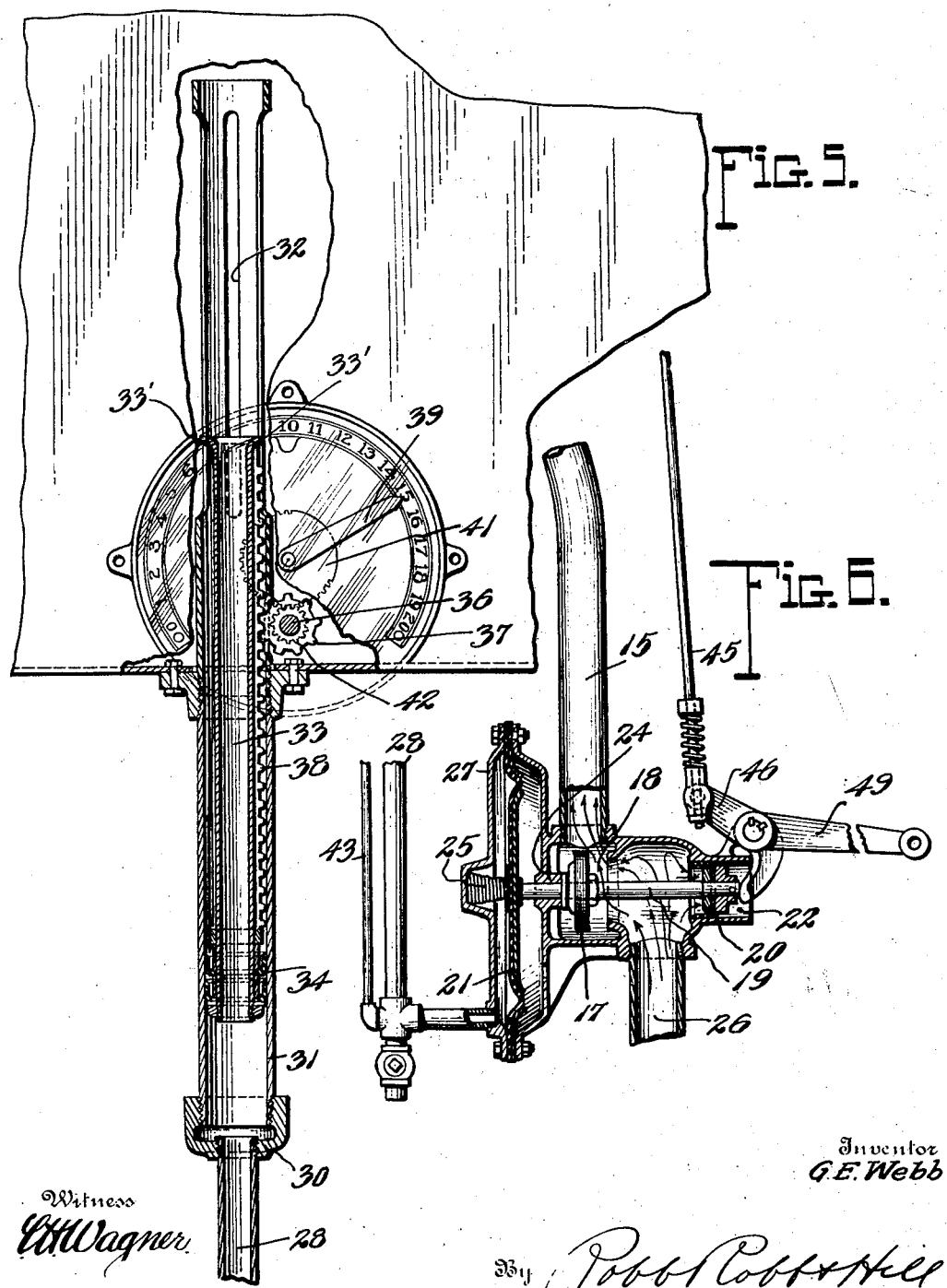

Patented Mar. 18, 1930

1,750,978

UNITED STATES PATENT OFFICE

GEORGE EVANS WEBB, OF MILWAUKEE, WISCONSIN, ASSIGNOR TO KOEHRING COMPANY, OF MILWAUKEE, WISCONSIN, A CORPORATION

AUTOMATIC MEASURING TANK

Application filed September 17, 1925. Serial No. 56,930.

In its preferred adaption, the present invention has to do primarily with water controls for supplying water to concrete mixers of the type known as concrete pavers. Machines of this type are used largely for road work in pavement construction. They are supplied with water for the mixer by means of pipe lines of greater or less length, and the water passes to the mixer under pressures which vary in rather a wide range dependent upon the particular water supply.

In the present invention there has been designed a special measuring tank and water supply valve mechanism, especially suitable for the work above outlined.

The invention in a general way embodies a water supply system or apparatus including novel means for predetermining the amount of water which will be received by the water supply tank from which the water is directly fed to the mixer. There is included also a special design of automatic control valve by which water from the main supply line will be caused to pass into the tank to replenish the supply in the latter, after it has been emptied. The operating means for the said automatic valve mechanism comprises an auxiliary manual control device adapted under peculiar conditions to actuate the valve mechanism to, if necessary, permit of adding amounts of water supplementing an amount measured by the measuring tank, to be delivered to the mixing drum of the mixer should occasion require.

The invention involves a peculiar form of inflow pipe leading to the mixing drum and forming a unit with the construction of the splash plate one of which is usually a part of mixing drum construction.

The invention involves other detail features of construction and arrangement of the parts of the apparatus which has been generally described and a full understanding of the same together with the merits and advantages thereof will be had upon reference to the accompanying drawings in which:—

Figure 1 is a view in elevation of the framework of a concrete paver, the mixing drum partly broken away and shown in section, the loading skip shown elevated, and said operating parts of the water supply means of the invention illustrated in conjunction with mixing and loading instrumentalities.

Figure 2 is a view of the parts shown in Figure 1, the loading skip omitted and the view taken at about right angles to Figure 1.

Figure 3 is a view showing the measuring tank broken away and partly in section and the associated water controlling instrumentalities for measuring the water passing from the tank to the mixer and for replenishing the supply of water in the tank.

Figure 4 is a view of the tank looking toward the end thereof and bringing out more clearly the control means for the measuring pipe.

Figure 5 is a view in section, and broken away, illustrating in an enlarged manner the operating means and the indicator for setting the measuring pipe of the measuring tank.

Figure 6 is a sectional view showing more particularly the automatic inlet valve mechanism and associated connections.

Describing my invention in detail I refer first to Figures 1 and 2. Herein there is illustrated the framework 1 of a concrete paving machine having the mixer comprising a drum 2. The drum 2 is equipped with the supply chute 3 into which the skip 4 is adapted to discharge its contents. The skip 4 is susceptible of being raised and lowered in the well known manner by mechanism not shown. Partly surrounding and beneath the chute 3 is a splash plate structure 5, integral with the chute 3 and provided with a water supply passage 6 leading into the mixing drum 2. This passage is preferably very narrow in width and relatively broad transversely, in other words very much elongated from side to side. At its upper end the passage 6 communicates with the inflow pipe 7 which leads from the passage 6 upwardly to the measuring tank 8. The lower end of the passage 6 is curved downwardly and the water flowing into the drum 2 through said pipe is received primarily in the lower angle portion of the adjacent head of the said drum, the tendency of said water being to clean or clear this portion of the drum head. In this manner the tendency of the head to become clogged at said particular portion is eliminated.

The measuring tank 8 will be seen from Figure 3 to comprise a suitable closed receptacle disposed at an elevation above drum 2. The supply pipe 7 leads into the bottom of the tank 8 at an angle and is equipped at its upper end with a valve 9 of the flap or pivoted type. The said valve 9 is pivotally connected at 10 with an arm 11 secured to a shaft 12 on which shaft there is the rigid arm 13 connected with an actuating rod 14 that leads over to a point adjacent to the skip 4. In fact the rod 14 is adapted to be struck and operated by the skip 4, most preferably when the said skip is 20° above the horizontal so as to impart a pull to the actuating rod 14, and in this manner the tank valve 9 is opened and water previously supplied to the tank 8 by means to be shortly described, flows freely down the pipe 7, through the passage 6, and into the mixing drum 2.

Leading into the bottom of the tank 8 is a water supply pipe 15 of considerable diameter, said pipe being connected with valve casing 16 in which is mounted the automatic water inlet controlling valve 17. The valve 17 is movable toward and from a valve seat 18 provided in the casing 16, and is operable by a stem or rod 19, one end of which is attached to a counter balancing piston 20 and the other end of which is attached to an actuating diaphragm 21. The piston 20 is mounted in a piston chamber extension 22 of the casing 16 and the diaphragm 21 is mounted in a diaphragm chamber 23 separated from the interior of the chamber or casing 16 but in part integral therewith if desirable. The rod or stem 19 passes through an opening in an end wall 24 of the casing 16 to the point of connection of said stem with the diaphragm 21, and a spring 25 bears against the diaphragm at its side remote from the valve 17, and tends to hold the valve seated against its seat 18. An inflow pipe 26 communicates with the lower portion of the valve casing 16 and may be a part of or connected with the main line water supply provided for the concrete paving mixer.

The diaphragm chamber 23 is closed in at the side thereof opposite the end wall 24 by closure plate 27. Connected with the diaphragm chamber 23 at the side thereof at which the spring 25 is disposed is a water pipe 28 coupled by an extension 29 at its lower end with the plate 27. This water pipe 28 extends upwardly in somewhat parallel relation to the pipe 15 and at its upper portion it is connected as at 30 with a barrel or cylinder 31 which leads into the bottom of the tank 8 and is provided with longitudinal slots 32, at its upper portion. Within the tank mounted to slide vertically in the cylinder 31 is a measuring pipe 33 which telescopes within the cylinder and is provided with piston packing 34 between its lower end and the cylinder. This packing prevents water from passing into the space between the cylinder and said pipe 33 below the packing. At its upper end the pipe 31 may be formed with outwardly extending projections 33' entering slots 32 and interlocking the pipe 33 with the cylinder 31 so as to prevent relative rotation of these parts. But the pipe 33 is adapted to slide vertically in the cylinder 31 and in this manner controls the level at which the water will be replenished in the tank 8 after emptying of the latter in a manner that will be later more clear when the cooperation of this pipe 33 and the pipe 28, respecting the automatic valve mechanism, is set forth. For raising and lowering the pipe 33 any suitable mechanism may be used but I illustrate a handle 35 for this purpose. The handle 35 is carried by shaft 36 equipped with a gear 37 that meshes with a rack or rack teeth 38 on a side of the pipe 33. By turning the handle 35 and rotating the gear 37 it is obvious that the pipe 33 may be raised or lowered at will. To determine the proper height at which the pipe 33 may be adjusted for controlling different quantities of water to be replenished to the tank 8 an indicator 39 may be employed cooperating with a dial for it having indicia, indicative of gallons in the tank, thereon. The indicator is connected by speed reduction gearing including the large gear 41 and the small gear 42, with the shaft 36.

Communicating with the diaphragm casing 23 is an air vent pipe 43, the lower end of which is connected with the union that connects the pipe 28 and 29 and said air pipe 43 extends upwardly to the upper portion of the tank 8 and within the latter, and at its upper extremity has a goose neck 43'.

The tank valve operating shaft 12 has a third arm 44 thereon connected by a rod 45 with a pivoted lever 46 mounted on a bracket 47 carried by the valve casing 16. A lever arm 48 is fixed to the pivotal axis 49 of the lever 46 and is attached to the lower end of a foot piece 50 supported in any suitable manner on the framework of the mixing machine convenient for the depression by the foot of the operator of said machine. The rod 45 has a yielding connection comprising a spring 51 and a slip joint 53 intermediate it and the lever 46. The lever 46 at its lower end curves and is engageable with the adjacent end of the stem 19 through the open end of the extension of the piston cylinder extension 22 of the casing 16.

With the parts of the invention constructed and associated as above set forth, the operation of the mechanism may now be described.

The hand wheel 35 will be turned to adjust the pipe 33 so that the upper end of the pipe will determine the level of the water in the tank 8 at which the water will flow into pipes 33 and 28. This particular level controls the quantity of water which will be supplied to the tank 8, and which will be received therefrom by the mixing drum 2 when the tank valve 9 is opened. Assuming that the tank 8 is empty water under pressure admitted through the pipe 26 to the casing 16 will open the water inflow valve 17 because the area of said valve is greater than the area of piston 20 which tends to counterbalance said pressure. Under these conditions the water will flow upwards through the pipe 15 into the tank 8 until the level is such that said water overflows into the pipes 33 and 28, sufficiently to fill these pipes. Air in the pipe 28 is displaced through the vent pipe 43, although some of said air may be trapped in the pipe 28 and compressed by the weight of water above it. In either case the column of water in pipe 28 will create a pressure on diaphragm 21, either directly or through the medium of the entrapped air, said pressure being sufficient to close the valve 17 with ample pressure to effect firm seating of said valve. In this manner the valve 17 is closed and cuts off the supply of water from the pipe 26 to the inflow pipe 15. The tank 8 now contains a supply of water adapted to pass to the drum 2 when the tank valve 9 is opened. Within practical limits, due to friction and inertia of moving parts, the total pressure exerted on the diaphragm 21 will be considerably in excess of that necessary to firmly set the valve 17 for closing the same quickly and positively.

When the skip 4 is well started in its upward movement to discharge the contents of solid aggregates into the drum 2, it trips the rod 14, opens the valve 9 and thereby causes the water in the tank 8 to pass to the mixing drum 2. At the same time as the valve 9 is opened the rod 45 is actuated but does not influence the lever 46 on account of the yieldable connection 51. When it is desired to replenish the supply of water in the tank 8 the operator depresses the foot piece 50 the full distance of movement which said member may be actuated. In this way the shaft 49 is rocked with the lever 46 and the said lever moves the stem 19 and opens the valve 17 to renew the flow of water from the pipe 26 into the pipe 15. Said flow is stopped in the manner which has before been set forth, a full cycle of operation of the parts having now been completed.

Should it be desired, however, after opening the tank valve 9, to increase the quantity of water supplied to the mixer, over the above measured quantity in the tank, the operator may readily depress the foot piece 50 partially only until its shoulder 52 abuts the support in which the foot piece 50 is mounted. Under these conditions the valve 17 will only be partially opened and a supplemental supply of water provided for passage into the drum 2.

It is notable that the tank valve 9 is closed by the operation of the foot piece 50 through the linkage 45 and interposed levers and lever arms. A certain degree of flexibility is provided by the slip joint 53 and the spring 51 previously referred to.

When the foot piece 50 is depressed, the actuation of the valve 17 and movement of the diaphragm 21 take place simultaneously, the diaphragm acting as a pump which returns some of the water in the pipe 28 to the tank 8, the valve 17 remaining open to replenish the supply of water in the tank as previously set forth. In order to provide a surplus pumping capacity for the diaphragm the stroke of the latter due to the action of the foot piece is longer than is necessary to fully open the valve. This is made possible by the provision of the spring 25 which will be compressed by extreme travel of foot piece 50, and on releasing of said footpiece will partially return the valve 17 to an intermediate position allowing the full opening area of said valve.

The difference in the pressure areas of the diaphragm 21, valve 17 and piston 20 works out in the operation of the device, as follows:

Assuming that the diaphragm 21 has an effective area of 100 square inches, valve 17, 4½ square inches, and piston 20, 3 square inches, that the pressure in the supply line at pipe 26 is 100 pounds; and that the elevation of the tank 8 above the center of the diaphragm 21 is 7 feet, the forces exerted work out substantially in this manner. The force tending to close the valve is a summation of two forces, namely, that exerted by the diaphragm 21 added to that exerted by the piston 20. The force exerted by the diaphragm is equal to the area of the diaphragm (100 sq. in.) multiplied by the pressure head caused by the column of water in the pipe 28 connected with the diaphragm chamber. The pressure head for the assumed height of 7 feet is equal to the following expression:

7/34 ft. × 14.7 = 3.03 pounds per square inch, in which 14.7 is atmospheric pressure and 34 ft. is the equivalent to 14.7 expressed in feet of water.

Therefore, the force exerted by the diaphragm is 3.03 pounds per square inch times 100 square inches, or 303 pounds.

Likewise, the force exerted by the piston is the product of the area of the piston and the pressure per square inch exerted thereon, which in this calculation has been assumed to be 100 pounds per square inch. Therefore, the force exerted by the piston is 100 × 3 or 300 pounds, and the total force tending to close the valve is 303 plus 300 or 603 pounds.

In a similar manner, the force tending to open the valve is 4.5 (the area of the valve) multiplied by 100 (the pressure per square inch on the valve), or 450 pounds. Therefore, the net or effective force which closes the valve is 603—450 or 153 pounds.

It can be readily seen that the only variable factor in the above assumptions will be the main line pressure. This will probably never be less than 30 pounds per square inch. Then, recalculating in the above manner using 30 pounds per square inch as the main line pressure, a net force of 258 pounds is found to be the effective force which closes the valve. This is larger than the value found when using 100 pounds per square inch main line pressure and will be a maximum for any range of pressures between 30 and 100. It is therefore necessary to construct a foot lever for the operator that will have enough mechanical advantage to enable him to overcome this maximum force and reset the valve.

When the operator depresses the foot lever, a pumping action as hereinbefore described takes place. The diaphragm is moved to the left thereby forcing part of the water in the diaphragm chamber into the pipe, this action forcing the water already in the pipe, up and out into the tank. Upon the release of the foot lever, the diaphragm is partially returned by the action of spring 25, and the water in the pipe drains back into the diaphragm chamber. In this manner, the pressure head acting on the diaphragm is removed and the force exerted by the diaphragm tending to close the valve is practically negligible. Since the area of the valve is greater than that of the piston and since they are both acted upon by the same main-line pressure, the valve will remain open until the tank fills and water overflows into and fills the pipe 28, thereby again creating a pressure head which acts on the diaphragm and closes the valve as shown in the above calculation.

Having thus described my invention, what I claim as new and desire to secure by Letters Patent, is:

1. In water supply means of the class described, a water supply pipe adapted to carry water to a mixing drum, a supply tank with which said supply pipe communicates, a water supply pipe leading to said tank to replenish water flowing therefrom, valve mechanism controlling the passage of water through the last mentioned pipe to the tank and through which the water supplied to the tank flows, and control means for said valve mechanism comprising a pressure diaphragm and a pipe for conveying water to the valve mechanism, and adjustable means in the tank to permit water in the latter to overflow into the last mentioned pipe.

2. In water supply means of the class described, in combination, a supply tank, an outflow pipe leading from said tank adapted to supply water to a mixer, an inlet pipe communicating with said tank, automatic valve mechanism controlling the supply of water to the tank through said inlet pipe and including a pressure device, an overflow pipe leading from the tank to the pressure device, and means in the tank to regulate the passage of water supplied to the tank into said overflow pipe, the said pressure device constituting a pump to force water in the overflow pipe back into the tank, and means for actuating the pressure device for such purpose.

3. In water supply means of the class described, in combination, a supply tank, an outflow pipe leading from said tank adapted to supply water to a mixer, an inlet pipe communicating with said tank, automatic valve mechanism controlling the supply of water to the tank through said inlet pipe and including a pressure device, an overflow pipe leading from the tank to the pressure device, and means in the tank to regulate the passage of water supplied to the tank into said overflow pipe, the valve mechanism comprising a valve controlling passage of water through the inlet pipe into the water tank and being connected with the pressure device, and means for actuating said valve to permit passage of water through the inlet pipe into the tank, and at the same time actuating the pressure device to pump the water in the overflow pipe back into the tank.

4. In water supply means of the class described, in combination, a supply tank, an outflow pipe leading from said tank adapted to supply water to a mixer and an inlet pipe communicating with said tank, automatic valve mechanism controlling the supply of water to the tank through said inlet pipe and including a pressure device, an overflow pipe leading from the tank to the pressure device, and means in the tank to regulate the passage of water supplied to the tank into said overflow pipe, said pipe being connected with the pressure device, an air vent pipe communicating with the overflow pipe.

5. In water supply means of the class described, in combination, a supply tank, an outflow pipe leading from said tank adapted to supply water to a mixer and an inlet pipe communicating with said tank, automatic valve mechanism controlling the supply of water to the tank through said inlet pipe and including a pressure device, an overflow pipe leading from the tank to the pressure device, and means in the tank to regulate the passage of water supplied to the tank into said overflow pipe, said pipe being connected with the pressure device, an air vent pipe communicating with the overflow pipe, the valve mechanism comprising a valve controlling the passage of water through the inlet pipe to the tank, the pressure device comprising a diaphragm of a larger area than the said valve and adapted to receive pressure of water in the overflow pipe for closing the valve.

6. In water supply means of the class described, in combination, a supply tank, an outflow pipe leading from said tank adapted to supply water to a mixer and an inlet pipe communicating with said tank, automatic valve mechanism controlling the supply of water to the tank through said inlet pipe and including a pressure device, an overflow pipe leading from the tank to the pressure device, and means in the tank to regulate the passage of water supplied to the tank into said overflow pipe, said pipe being connected with the pressure device, an air vent pipe communicating with the overflow pipe, the valve mechanism comprising a valve controlling the passage of water through the inlet pipe to the tank, the pressure device comprising a diaphragm of a larger area than the said valve and adapted to receive pressure of water in the overflow pipe for closing the valve, together with manual means to operate said valve and diaphragm for opening the valve.

7. In water supply means of the class described, in combination, a supply tank, an outflow pipe leading from said tank adapted to supply water to a mixer and an inlet pipe communicating with said tank, automatic valve mechanism controlling the supply of water to the tank through said inlet pipe and including a pressure device, an overflow pipe leading from the tank to the pressure device, and means in the tank to regulate the passage of water supplied to the tank into said overflow pipe, said pipe being connected with the pressure device, an air vent pipe communicating with the overflow pipe, the pressure device comprising a diaphragm and the valve mechanism comprising a valve controlling the passage of water through the inlet pipe to the tank and means for actuating said valve to open it at the same time actuating the diaphragm to pump the water in the overflow pipe back into the tank, together with water operated counterbalancing means connected with the valve and diaphragm to counterbalance the action of the water that may tend to open the valve.

8. In water supply means of the class described in combination, a water supply tank, an outflow pipe leading therefrom adapted to supply a mixer, a water inlet pipe leading to the tank to supply water under pressure thereto, a valve mechanism controlling said inlet pipe including a valve, a pressure device including a diaphragm connected with said valve and of greater operative area than that of the valve, and means for supplying water from the tank to said pressure device to act thereon for moving the valve to a closed position after it has been opened.

9. In water supply means of the class described in combination, a water supply tank, an outflow pipe leading therefrom adapted to supply a mixer, a water inlet pipe leading to the tank to supply water under pressure thereto, a valve mechanism controlling said inlet pipe including a valve, a pressure device including a diaphragm connected with said valve and of greater operative area than that of the valve, and means for supplying water from the tank to said pressure device to act thereon for moving the valve to a closed position after it has been opened, the last mentioned means consisting of an overflow pipe communicating with the tank to receive water from the latter and means in the tank adapted to vary the overflow level of the water in the tank in relation to said overflow pipe.

10. In water supply means of the class described in combination, a water supply tank, an outflow pipe leading therefrom adapted to supply a mixer, a water inlet pipe leading to the tank to supply water under pressure thereto, a valve mechanism controlling said inlet pipe including a valve, a pressure device including a diaphragm connected with said valve and of greater operative area than that of the valve, and means for supplying water from the tank to said pressure device to act thereon for moving the valve to a closed position after it has been opened, the last mentioned means consisting of an overflow pipe communicating with the tank to receive water from the latter and means in the tank adapted to vary the overflow level of the water in the tank in relation to said overflow pipe, an outflow valve in the tank controlling outflow of water therefrom through the outflow pipe, and means for tripping said last valve to open it, together with manual means for opening the valve of said first mentioned valve mechanism adapted to close said outflow valve in the tank.

11. In water supply means of the class described in combination, a water supply tank, an outflow pipe leading therefrom adapted to supply a mixer, a water inlet pipe leading to the tank to supply water under pressure thereto, a valve mechanism controlling said inlet pipe including valve, a pressure device including a diaphragm connected with said valve and of greater operative area than that of the valve, and means for supplying water from the tank to said pressure device to act thereon for moving the valve to a closed position after it has been opened, the last mentioned means consisting of an overflow pipe communicating with the tank to receive water from the latter and means in the tank adapted to vary the overflow level of the water in the tank in relation to said overflow pipe, an outflow valve in the tank controlling outflow of water therefrom through the outflow pipe, and means for tripping said valve to open it, together with manual means for opening the valve of said first mentioned valve mechanism and adapted to close said outflow valve in the tank, and a pressure counterbalancing piston connected with the valve controlling the inlet pipe and operable by said manual means along with the valve.

In testimony whereof I affix my signature.

GEORGE EVANS WEBB.